(12) United States Patent
Roberts

(10) Patent No.: US 9,752,549 B2
(45) Date of Patent: Sep. 5, 2017

(54) APPARATUS FOR CONVERTING ENERGY FROM FLUID FLOW

(71) Applicant: VERDERG LTD, Kingston upon Thames (GB)

(72) Inventor: Peter Roberts, Horsham Surrey (GB)

(73) Assignee: VERDERG LTD, Kingston Upon Thames (GB)

( * ) Notice: Subject to any disclaimer, the term of this patent is extended or adjusted under 35 U.S.C. 154(b) by 243 days.

(21) Appl. No.: 14/409,210

(22) PCT Filed: Jun. 20, 2013

(86) PCT No.: PCT/GB2013/051612
§ 371 (c)(1),
(2) Date: Dec. 18, 2014

(87) PCT Pub. No.: WO2013/190304
PCT Pub. Date: Dec. 27, 2013

(65) Prior Publication Data
US 2015/0167626 A1    Jun. 18, 2015

(30) Foreign Application Priority Data

Jun. 20, 2012  (GB) .................................. 1210930.2

(51) Int. Cl.
*F03B 3/04* (2006.01)
*F03B 13/10* (2006.01)
(Continued)

(52) U.S. Cl.
CPC ................ *F03B 3/04* (2013.01); *F01D 25/24* (2013.01); *F03B 13/08* (2013.01); *F03B 13/10* (2013.01);
(Continued)

(58) Field of Classification Search
CPC .. F03B 3/04; F03B 13/08; F03B 13/10; F01D 25/24; F05B 2240/133; Y02E 10/22; Y02E 10/28; Y10T 29/49229
See application file for complete search history.

(56) References Cited

U.S. PATENT DOCUMENTS 2,376,536 A    5/1945  Gonzer
3,980,894 A    9/1976  Vary et al.
(Continued)

FOREIGN PATENT DOCUMENTS

CA    1 144 381         4/1983
CA    2 366 043 A1      6/2003
(Continued)

*Primary Examiner* — Igor Kershteyn
(74) *Attorney, Agent, or Firm* — Seed IP Law Group LLP

(57) ABSTRACT

An apparatus for generating electricity from water flow comprises a convergent section, a diffuser section and tube for locating within a body of water. The convergent section is connected to a first end of a mixing chamber such that a venturi is defined between the end of the convergent section and the mixing chamber. The diffuser section is connected to a second end of the mixing chamber, the diffuser section configured such that in use the pressure at the exit of the diffuser section is greater than the pressure at the venturi. At least part of the tube is located in the convergent section, such that an annulus is defined between the tube and the convergent section, to form a first flow passage. The tube defines a second flow passage within the tube; and a turbine connectable to a generator is located within the tube.

36 Claims, 8 Drawing Sheets

(51) Int. Cl.
  *F01B 25/24* (2006.01)
  *F03B 13/08* (2006.01)
  *F01D 25/24* (2006.01)
(52) U.S. Cl.
  CPC ......... *F05B 2240/133* (2013.01); *Y02E 10/22* (2013.01); *Y02E 10/28* (2013.01); *Y10T 29/49229* (2015.01)

(56) References Cited

U.S. PATENT DOCUMENTS

| | | | |
|---|---|---|---|
| 4,021,135 A | 5/1977 | Pedersen et al. | |
| 4,159,188 A | 6/1979 | Atencio | |
| 4,166,596 A * | 9/1979 | Mouton, Jr. | B64B 1/50 244/30 |
| 4,179,886 A | 12/1979 | Tsubota | |
| 4,204,799 A | 5/1980 | de Geus | |
| 4,208,873 A | 6/1980 | Foglia | |
| 4,320,304 A * | 3/1982 | Karlsson | F03D 1/04 290/44 |
| 4,504,192 A | 3/1985 | Cyrus et al. | |
| 4,960,363 A | 10/1990 | Bergstein | |
| 5,464,320 A | 11/1995 | Finney | |
| 5,709,419 A | 1/1998 | Roskey | |
| 5,977,649 A | 11/1999 | Dahill | |
| 6,239,506 B1 | 5/2001 | Roskey | |
| 6,368,059 B1 | 4/2002 | Maines | |
| 6,382,904 B1 * | 5/2002 | Orlov | F03D 1/04 415/1 |
| 6,437,457 B2 | 8/2002 | Roskey | |
| 6,568,181 B1 | 5/2003 | Hassard et al. | |
| 6,864,597 B1 | 3/2005 | Ricker | |
| 6,887,031 B1 * | 5/2005 | Tocher | F03D 1/04 290/55 |
| 6,967,413 B2 | 11/2005 | Atiya | |
| 8,446,031 B2 | 5/2013 | Roberts | |
| 2005/0017514 A1 | 1/2005 | Tocher | |
| 2005/0099011 A1 | 5/2005 | Rochester et al. | |
| 2005/0285407 A1 | 12/2005 | Davis et al. | |
| 2007/0040389 A1 | 2/2007 | Kelley | |
| 2008/0129254 A1 | 6/2008 | Frayne | |
| 2008/0232957 A1 | 9/2008 | Presz et al. | |
| 2009/0155074 A1 | 6/2009 | Sankar | |
| 2009/0236858 A1 | 9/2009 | Johnson | |
| 2009/0302612 A1 | 12/2009 | Gartner | |
| 2010/0007152 A1 | 1/2010 | Roskey | |
| 2010/0201132 A1 | 8/2010 | Ivanovich | |
| 2010/0213720 A1 | 8/2010 | Bailey et al. | |
| 2010/0283251 A1 | 11/2010 | Reynolds | |
| 2010/0289268 A1 | 11/2010 | Schiller | |
| 2011/0049896 A1 | 3/2011 | Burger et al. | |
| 2013/0088014 A1 | 4/2013 | Holstein et al. | |

FOREIGN PATENT DOCUMENTS

| | | |
|---|---|---|
| CN | 101952584 A | 1/2011 |
| DE | 35 42 096 A1 | 10/1987 |
| DE | 38 13 958 A1 | 11/1989 |
| DE | 41 05 499 A1 | 8/1992 |
| DE | 10 2005 040 805 A1 | 8/2007 |
| DE | 10 2010 018 892 A1 | 11/2011 |
| EP | 0 931 931 A1 | 7/1999 |
| EP | 0 977 343 A1 | 2/2000 |
| EP | 2 189 653 A1 | 5/2010 |
| EP | 2 568 161 A1 | 3/2013 |
| FR | 891 697 | 3/1944 |
| FR | 923.131 | 6/1947 |
| FR | 2 470 195 A1 | 5/1981 |
| FR | 2 497 877 A2 | 7/1982 |
| FR | 2 792 661 A1 | 10/2000 |
| GB | 1 381 295 | 1/1975 |
| GB | 2 001 396 A | 1/1979 |
| GB | 2 224 059 A | 4/1990 |
| GB | 2 415 748 A | 1/2006 |
| GB | 2 443 195 A | 4/2008 |
| GB | 2463504 A | 3/2010 |
| GB | 2471349 A | 12/2010 |
| GB | 2478743 A | 9/2011 |
| GB | 2479367 A | 10/2011 |
| GB | 2503250 A | 12/2013 |
| JP | 2005-520985 A | 7/2005 |
| JP | 2009-545692 A | 12/2009 |
| RU | 2 198 318 C2 | 2/2003 |
| RU | 2 345 245 C1 | 1/2009 |
| SU | 1204775 A | 1/1986 |
| WO | 98/12433 A1 | 3/1998 |
| WO | 0125629 A1 | 4/2001 |
| WO | 03/054385 A1 | 7/2003 |
| WO | 03/081029 A1 | 10/2003 |
| WO | 03/081030 A1 | 10/2003 |
| WO | 2005/017349 A1 | 2/2005 |
| WO | 2005/075818 A1 | 8/2005 |
| WO | 2006/055393 A2 | 5/2006 |
| WO | 2008/015047 A1 | 2/2008 |
| WO | 2009/009350 A2 | 1/2009 |
| WO | 2009/018666 A1 | 12/2009 |
| WO | 2010/032026 A2 | 3/2010 |
| WO | 2011/114156 A2 | 9/2011 |
| WO | 2013/190304 A1 | 12/2013 |

* cited by examiner

APPARATUS FOR CONVERTING ENERGY FROM FLUID FLOW

BACKGROUND

Technical Field

This invention relates to systems and apparatuses for generating power from a flow of water.

Description of the Related Art

Many systems have been proposed for converting wave, tidal, current or fluvial flows into electricity. One type of device that is used in generating power is the free-stream underwater turbine usually driven by tidal flow. Deployed underwater, free-stream turbines can be deployed in an array but they require considerable separation between individual turbines to avoid mutual performance degradation.

In practice these devices also require a high flow velocity to enable the devices to be used for commercial energy production. Underwater free-stream turbines rely on the kinetic energy present in the water flow to generate power and are required to be positioned in the path of high velocity flows to be cost-effective without an unfeasibly large diameter. This is because the kinetic energy of the flow incident on the turbine disc is proportional to the square of the speed of the free-stream flow.

The theoretical largest fraction of the incident kinetic energy that can be turned into mechanical energy by any free-stream turbine is called the Betz limit. Beyond this point, the water simply flows around the outside of the turbine disc as if the turbine was a solid obstruction and contributes no further energy.

A further type of device used to generate power is a hydropower dam where a source of water channels all the water through the turbines located within the dam. However these types of systems require a head difference of 5 meters or more to enable the generators to work efficiently. This therefore limits the number of sites that such a system can be used.

The present invention provides an alternative apparatus for generating power from a flowing body of water, particularly in situations where there is a high volumetric flow of water at relatively low speed, slower than the speeds desirable for efficient energy product from a free-stream turbine. Furthermore the present invention is not subject to the Betz limit and is thereby suited to generating very large amounts of energy.

BRIEF SUMMARY

The invention generally resides in an apparatus for generating electricity from water flow comprising:

a venturi tube having a convergent input region, a divergent output region configured as a diffuser, and a constricted throat region between the narrow end of the input region and the narrow end of the output region providing a flow passage between the input and output regions;

a tube having a turbine, configured in the venturi tube, and wherein the end of the tube is positioned such that the space between the venturi tube and tube forms a first flow passage, for a primary flow, and the tube forms a second flow passage, for a secondary flow, such that in use the flow of water through the first flow passage induces a flow of water through the second flow passage.

The tube having the turbine can be configured in the convergent input region wherein the end of the tube is positioned such that a space between the convergent input region and tube forms the first flow passage.

One aspect of the invention provides an apparatus for generating electricity from water flow comprising: a convergent section connected to a first end of a mixing chamber such that a venturi is defined between the end of the convergent section and the mixing chamber; a diffuser section connected to a second end of the mixing chamber, the diffuser section configured such that in use the pressure at the exit of the diffuser section is greater than the pressure at the venturi; at least part of a tube located in the convergent section, such that an annulus is defined between the tube and the convergent section, to form a first flow passage, and the tube defining a second flow passage within the tube; and a turbine connectable to a generator; wherein the turbine is located within the tube.

The tube can further comprise a screen having apertures at its upstream end. In one embodiment the tube comprises a screen having apertures provided across the opening of the tube.

The size of the apertures in the screen is selected to allow water to still flow through the tube, whilst preventing fish from entering the tube. The screen can be made from any suitable material, such as a perforated metal screen or netting. The size of the apertures is selected to deny entry into the tube by fish and other marine animals (otters, etc.) whilst still allowing water to flow through the tube. Any suitable screening system can be used. Preferably a fish screen is used.

As there is no turbine located in the outer pipe formed by the convergent section, mixing chamber and divergent chamber, the passage of the fish and other marine animals downstream is not imbedded. The fish and other marine animals can swim safely from one side of the dam the apparatus is located in, to the side. The apparatus is still able to recover a large amount of energy from the water flow whilst not damaging the fish and other animals. The fish being prevented from entering the inner tube by the screen.

The tube has an outlet and an inlet and at least part of a tube comprising the outlet is located in the convergent section. The tube being coaxial with the convergent section and there being a clearance between the tube and convergent section to define the first flow passage.

The tube can be moveable relative to the convergent section and the mixing chamber. The tube can be axially moveable relative to the convergent section and the mixing chamber.

The downstream end of the tube can be positioned level with the venturi section, upstream of the venturi section, or downstream of the venturi section. The end of the tube can be moveable between these positions.

The tube can be connected to the inner surface of the convergent section by support arms. The support arms can be profiled to minimize energy loss in the primary flow.

The tube can be supported within a hub. The hub can have a smooth profile to minimize flow interference. The hub can comprise a movement mechanism to move the tube axially. The hub and the tube can comprise a screw and thread mechanism to allow movement of the tube relative to the convergent section. The hub and tube can comprise other indexing mechanisms to allow movement of the tube relative to the hub and the convergent section.

The upstream end of the tube can be located within the convergent section or the upstream end of the tube can be located upstream from the entrance of the convergent section. The end of the tube can be moveable between these positions. The position of the upstream end of the tube is selected to optimize the secondary flow rate through the tube and the pressure difference between the upstream and downstream ends of the tube.

The tube can comprise an array of radial support blades within the tube. The array of radial support blades are of an opposite hand to the blades of the turbine. The fixed array of radial support blades are positioned in the tube at a location upstream or downstream of the turbine.

The tube can have a convergent region at its upstream end. The convergent region can help facilitate the establishment of the desired flow speed through the turbine. The tube can have a divergent region at its downstream region.

In one embodiment the tube can have a substantially uniform diameter along its length. The opening of the tube and the exit of the tube having substantially the same diameter.

The ratio of the cross sectional area of the entrance of the convergent section to the cross sectional area of the entrance of the mixing chamber is selected to optimize the secondary flow rate through the tube and the pressure difference between the upstream and downstream ends of the tube.

The ratio of the cross sectional area of the entrance of the mixing chamber and the cross sectional area of the tube is selected to optimize the secondary flow rate through the tube and the pressure difference between the upstream end and downstream end of the tube.

The ratio of the cross sectional area of the entrance of the convergent section to the cross sectional area of the exit of the diffuser section is selected to optimize the performance of the device. The ratio of the cross sectional area of the entrance of the convergent section to the cross sectional area of the exit of the diffuser section can be 1:1.

The turbine can be connected to a coaxial generator by a drive shaft. Alternatively the turbine is connected to a remote generator by pulley wheel and drive belts, gear wheels and drive shafts, a hydraulic pump, or pipe-work and a hydraulic motor, or a mixture of the above.

The exit of the diffuser section can have a substantially rectangular, circular or oval cross section.

The entrance of the convergent section can have a substantially rectangular, circular or oval cross section.

The exit of the diffuser section and the entrance of the convergent section can both have a substantially circular cross section.

The mixing chamber can have a substantially circular cross section along its length. The mixing chamber can be tapered or flared in the downstream direction to optimize the secondary flow rate through the tube and pressure difference between the upstream and downstream ends of the tube.

By tapered it means that the mixing chamber converges in the downstream direction such that the opening of the mixing chamber has a greater diameter than the exit of the mixing chamber. By flared it means that the mixing chamber diverges in the downstream direction such that the opening of the mixing chamber has a smaller diameter than the exit of the mixing chamber.

The outer pipe venturi and the mixing regions are free from a turbine. By not providing a turbine directly in the mixing chamber or directly in the venturi helps in maintaining an appropriately conditioned flow through this region before the flow enters the diffuser section. The divergent section is also free of a turbine. The turbine is only provided in the inner tube such that only secondary flow passes by the turbine.

The invention can further reside in a system comprising a plurality of venturi tubes, each venturi tube having a convergent input region, a divergent output region configured as a diffuser, and a constricted throat region between the narrow end of the input region and the narrow end of the output region providing a flow passage between the input and output regions;

a tube having turbine, an inlet region and multiple outlet regions, the tube being configured in the venturi tubes, such that each outlet of the tube is positioned in a convergent input region of a venturi tube such that the space between the convergent input region and the part of the tube in the input region forms a first flow passage, for the primary flow, and the tube forms a second flow passage, for a secondary flow, such that in use the flow of water through the first flow passages induces a flow of water through the second flow passage. The turbine can be located in the inlet region of the tube.

A further aspect of the invention provides an apparatus for generating electricity from water flow comprising
   a plurality of convergent sections, each convergent section connected to a first end of a mixing chamber such that a venturi is defined between the end of the convergent section and the mixing chamber;
   a plurality of diffuser sections each diffuser section connected to a second end of one of the mixing chambers, the diffuser configured such that in use the pressure at the exit of the diffuser is greater than the pressure at the venturi;
   a tube comprising a inlet tube, a manifold and a plurality of outlets tubes extending from the manifold, wherein at least part of one of the outlet tubes is located in one of the convergent sections, such that an annulus is defined between the outlet tube and the convergent section, to form a first flow passage, and the tube defining a second flow passage within the tube; and
   a turbine connectable to a generator; wherein the turbine is located within the tube.

A screen having apertures can be located across the opening of the inlet tube.

The turbine is located in the inlet tube. The tube can further comprise a diffuser region located between the manifold and inlet tube.

The cross sectional area of the manifold region of the tube can be larger than the cross sectional area of the tube where the turbine is located.

The apparatus as described above can be attached to a dam to provide a flow passage through the dam.

A further aspect of the invention comprises a system for generating electricity from water flow comprising; a barrier for locating across the cross-section of a flowing body of water; and provided with at least one apparatus as described above, wherein the apparatus is positioned such that in use provides a flow path from the upstream side of the barrier to the downstream side of the barrier.

The barrier can comprise at least two apparatuses as described above. Preferably the barrier comprises an array of apparatuses as described above. The apparatuses are incorporated into the barrier to provide a flow path from one side of the barrier to the other.

The input region and the output region can be reversed for bidirectional use such as in a tidal flow. By way of example the features in the input region, such as a tube with a turbine, could also be provided in the output region.

The apparatus can be used to provide a flow passage through a barrier. A barrier may be a dam or other such installation in a body of water that creates a high pressure reservoir or containment of water on one side.

A further aspect of the invention comprises a method for providing a flow passage through a barrier across a body of water comprising:

installing an apparatus as described above in the barrier.

A further aspect of the invention comprises a method of generating electricity from a flow of water comprising:

installing a system or apparatus as described above across a body of water to provide a reservoir of water, such that a head difference is created between the downstream and upstream sides of the barrier; and
    using the flow of water through the apparatus to rotate the turbine.

In the following description, the terms "upstream" and "downstream" are used to define relative locations of features of the apparatus. The upstream and downstream directions are defined in relation to the direction which the water flows through the apparatus in use. The upstream end can be considered the input region and the downstream end can be considered the output region.

BRIEF DESCRIPTION OF THE SEVERAL VIEWS OF THE DRAWINGS

The invention will now be described by way of example with reference to the accompanying drawings.

DETAILED DESCRIPTION

Figure 1:
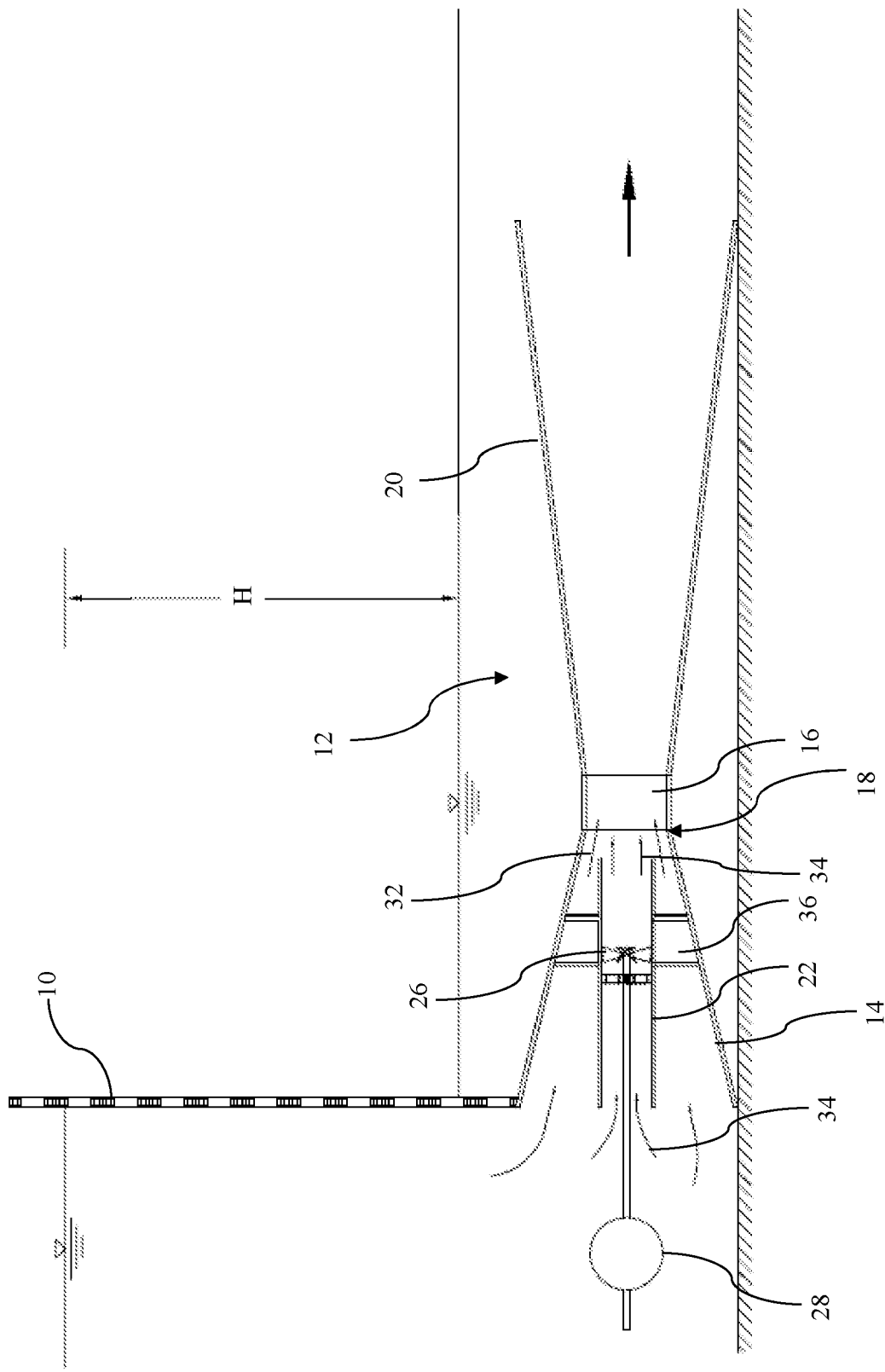
FIG. 1 shows a cross sectional side view of an embodiment of the invention.

FIG. 1 shows a system according to the invention for converting water flow to electricity. The system comprises a barrier 10 positioned across the width of a body of water and an apparatus 12 providing a flow passage for water through the barrier 10 from the upstream side of the barrier to the downstream side of the barrier. The system converts hydraulic flow energy into hydraulic potential energy and then converts the hydraulic potential energy into electrical energy. The resistance of the barrier to the flow induces a rise in the upstream water free surface creating an inventory of potential hydraulic energy that drives the flow through the apparatus and from which the turbine extracts mechanical energy for conversion to electricity. The inventory of potential hydraulic energy in the uplifted upstream free surface is continuously replenished by the kinetic energy of the upstream flow.

Figure 2:
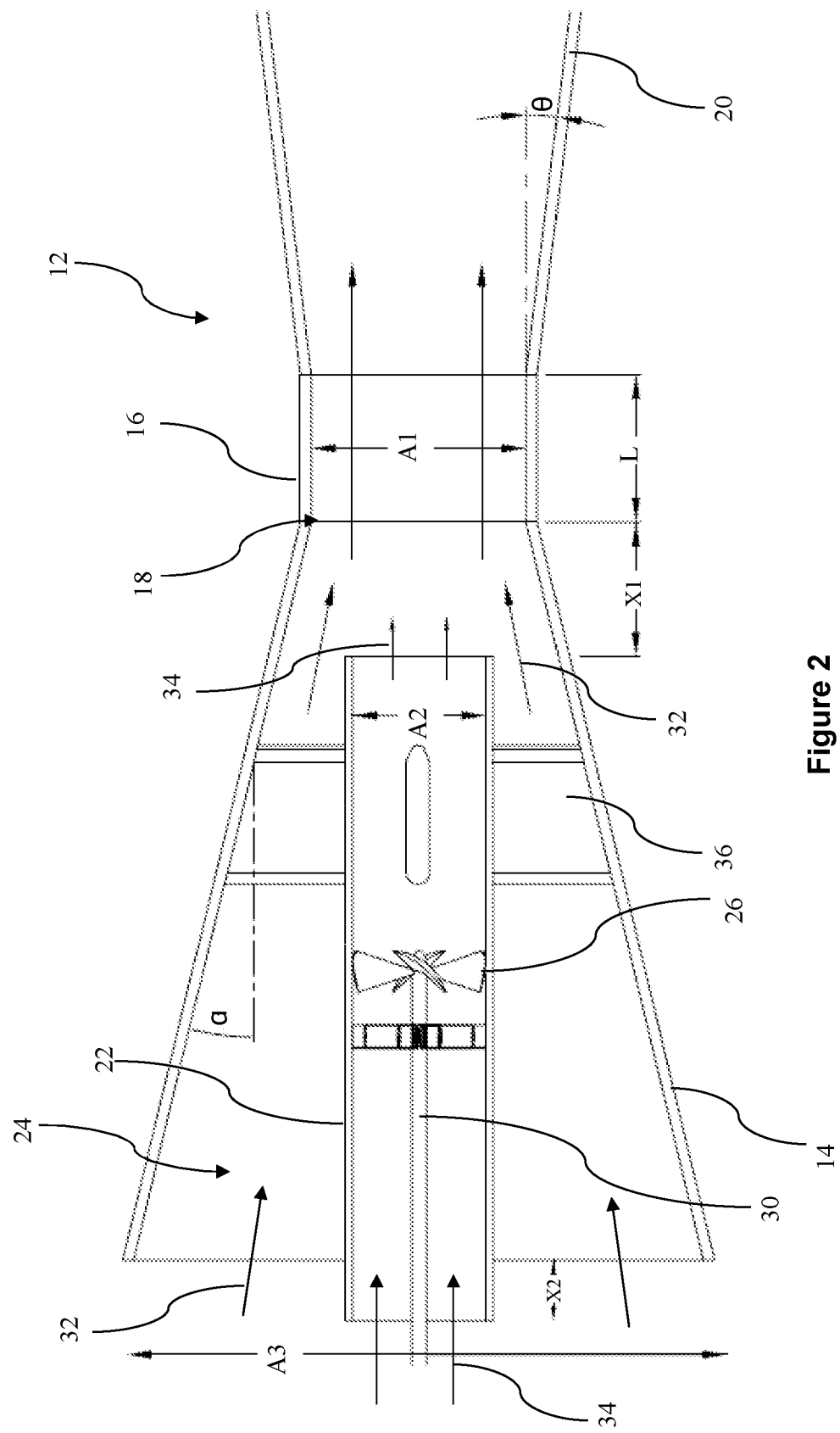
FIG. 2 shows a cross sectional side view of an embodiment of the invention.

With reference to FIGS. 1 and 2 the apparatus 12 provides a flow passage from an upstream location to a location downstream of the barrier 10. The apparatus 12 comprises a convergent section 14 that narrows towards a mixing chamber 16 such that a venturi 18 is defined at the boundary of the convergent section and the mixing chamber 16. A divergent diffuser section 20 extends from the exit of the mixing chamber 16.

A tube 22 is located along at least part of the length of the convergent section 14 such that an annulus 24 is formed between the outer surface of the tube 22 and the inner surface of the walls defining the convergent section 14. The longitudinal axis of the tube 22 is substantially aligned with the longitudinal axis of the convergent section 14. A turbine 26 is located within the tube 22 and connected to a generator 28 via a drive shaft 30.

A first flow path for the primary flow 32 is defined within the annulus 24 between the tube 22 and the walls of the convergent section 14. A second flow path for a secondary flow 34 is defined within the tube 22. The annulus is not restricted to a circular, ring shaped space between the tube and inner walls of the convergent section. The shape of the annulus will depend on the cross sectional shape of the convergent section and the tube.

The barrier 10 across the body of water provides a pressure head upstream of the apparatus. This converts some of the kinetic energy from the flow velocity into potential energy from the raised water level as the flow slows down as the water depth behind the barrier gets deeper. The resulting head difference (H) permits the conversion of the potential energy into useful energy above the upper output limit, known as the Betz limit, of a free stream device which extracts kinetic energy directly from an equivalent flow. Water from the upstream side of the barrier 10 flows through the convergent section 14 into the mixing chamber, and then out the apparatus via the diffuser section 20. A secondary flow 34 through the tube 22 is induced which drives the turbine 26 and hence powers the generator module.

The convergent section 14 accelerates water flow into the low pressure zone at the venturi, formed in accordance with Bernoulli's theorem. The low pressure zone induces the secondary flow through the tube. Both the primary and secondary flows enter the mixing chamber where the two flows mix. The mixed flow enters the diffuser section and the velocity of the water flow slows as it moves through the diffuser section. As the water flows through the diffuser section 20 the flow regains its static head and losses its dynamic head before it exits the diffuser section 20 downstream. This preserves the low static head in the venturi.

Thus the apparatus is able turn a high volume, low head flow into a low volume high-head flow from which electrical power can be generated with a conventional reaction turbine.

The major part, the primary flow 32, of the water flow will pass through the annulus 24 formed between the walls of the convergent section 14 and the tube 22. A smaller volume of water, the secondary flow 34, will flow through the tube 22 driving the turbine 26. As the primary flow 32 converges towards the venturi in the convergent section, the primary flow 32 accelerates and loses static head in accordance with Bernoulli's Theorem. The high speed primary flow 32 outside the tube 22 at the tube exit assists in drawing the slower secondary flow 34 out of the end of the tube 22 into the primary flow 32.

In one embodiment the device is designed such that approximately 80% of the water flow passes through the annulus 24 and the remaining approximately 20% of water flow is drawn through the tube 22.

The convergent section is in the form of a funnel having a first opening as an entrance for receiving water from behind the barrier at one end and a narrower opening as an exit at the opposite end to release water into the mixing chamber 16. The convergent section 14 tapers down from the upstream end towards the entrance of the mixing chamber 16. A venturi is defined at the boundary of the convergent section and mixing chamber. The parameters of the convergent section, such as the angle of convergence, α (alpha), the length the section, and the size, such as the diameters, of the entrance and exit of the convergent section can be selected to optimize the performance of the apparatus.

The mixing chamber 16 provides an area in which the secondary and primary flow can combine to form a substantially uniform flow, which is substantially homogenous before exiting the mixing chamber into the diffuser section 20 with a velocity profile that allows sufficient pressure recovery in the flow through the diffuser section to sustain the pressure difference between the low pressure at the venturi and the higher pressure at the exit of the diffuser section. The low pressure thereby sustained at the venturi adjacent the downstream end of the tube is communicated to the back face of the turbine mounted inside the tube providing an amplified head drop across the turbine.

The mixing chamber is configured to maximize the power output of a turbine located in the secondary flow. This is achieved, at least in part, by the mixing chamber being configured to optimize the flow regimes in the region immediately downstream of the point where the secondary flow through the turbine induced by the low pressure in the venturi starts to co-mingle with the primary flow. The mixing chamber is configured to optimize the energy transfer from the primary flow into the secondary flow in this mixing chamber.

The mixing chamber has an opening, an exit and non-zero length to provide a space in between the opening and the exit in which the flow can mix. The length (L) of the tubing defining the mixing chamber 16 is selected such that an appropriately conditioned flow is obtained before the flow enters the diffuser section. Selecting the correct length for the flow and pressure conditions ensures that there is optimum energy transfer between the fast moving primary flow and the slower secondary flow, such that there is an acceptable velocity profile across the two flows before the combined flows enters the diffuser section.

By way of example, the convergent section, the tube positioned therethrough and the configuration of the mixing chamber together with the diffuser section and the design of the turbine in the tube, are all configured as a system to optimize the pressure drop in the tube across the turbine in conjunction with the volumetric flow rate induced through the tube that passes through the turbine located therein to maximize the output from the turbine.

Unlike kinetic energy machines in a free fluid stream, wherein the maximum power of any such machine is subjected to the Betz limit, and an array of such machines requires them to be placed with a significant separation between each machine, this invention first creates an inventory of potential hydraulic energy from the kinetic energy of the entire flow by raising the upstream water level due to the provision of the barrier across the entire width of the body of water and then concentrates much of this inventory of potential energy into the smaller part of the flow passing through the tube in which a suitable turbine is mounted and across which a correspondingly amplified pressure drop is created, permitting electrical energy to be generated at high "water to wire" efficiency.

The current invention addresses problems commonly encountered in the use of a free stream turbine array placed in turn across a body of water. If such a free stream turbine array was placed across the same body of flowing water as the present invention, to achieve acceptable efficiencies, the diameter of the turbine disc of the free stream turbine will be much larger than for the current invention. The speed of rotation of the turbine of the free stream turbine will be much slower and it will therefore need a large, expensive heavy duty step-up gearbox to drive its generator compared to the apparatus of the present invention. In many sites, including most rivers and many tidal estuary sites, the desirable diameter of a free stream turbine can significantly exceed the available water depth. As a smaller turbine can be used with the system of the invention to achieve equivalent and/or greater efficiencies the system is suitable to be used in a greater range of sites.

The free surface of the upstream water behind the system of the invention is uplifted over the whole width of the flow, typically, by 1.5 m to 3.5 m. For free stream turbines, there will be a small "bulge" on the water surface above the turbine, caused by the resistant of the of the turbine to the flow of water, and which is a measure of the energy generating capacity of that free stream turbine. This bulge is typically undetectable by normal sight. The uplift just upstream of a free surface turbine is almost imperceptible because of the constraints of the Betz Limit. Furthermore, this small uplifted volume is local to each free stream turbine in plan and the Betz Limit also prescribes significant open water between each free stream turbine in an array so that the volume of uplifted water above and just upstream of a free stream turbine or turbine array is radically smaller than that uplifted upstream of this invention placed across the same flowing body of water, typically by an order of magnitude or more. This comparison of volumes of uplifted water is a direct measure of the comparative energy available for conversion into electricity by each type of machine. The system of the invention therefore typically has an order of magnitude or more energy available to it than a free stream turbine or free stream turbine array has from the same body of water.

Furthermore, the invention creates a much larger water head uplift upstream than would deployment of a free stream turbine and then, typically amplifies that head difference further by a factor of 3 to 5 times in the induced secondary flow which is typically 20% of the upstream flow. So the driving head (pressure) of the turbine in the invention is greater than that across a free stream turbine, typically by an order of magnitude or more. This apparatus of the invention can therefore use a turbine with a diameter that is smaller by an order of magnitude or more, and rotates at a speed that is higher by an order of magnitude or more, than a typical free stream turbine.

A typical hydropower dam, where a barrier across a source of water channels all the flow of water through of turbine requires a head difference of typically 5 m or more to make the generator work efficiently. However because of the pressure amplification in the induced secondary flow the invention can operate such a turbine cost-effectively at head differences of around 1.5 m.

Figure 3:
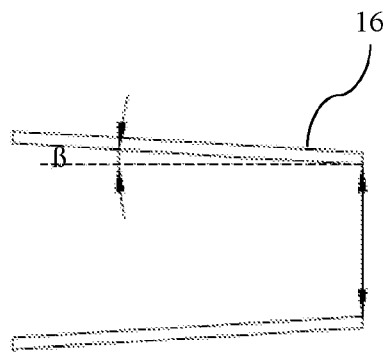
FIG. 3 shows an example of a mixing chamber for use in the apparatus of the invention.

With reference to FIG. 3 in one embodiment of the invention the mixing chamber 16 can taper in the downstream direction by a half cone angle of β, beta, such that the exit of the mixing chamber is narrower than its entrance. The half cone angle of the mixing chamber can be positive or negative. In an alternative embodiment the mixing chamber can taper in the upstream direction such that the exit of the mixing chamber is wider than the entrance of the mixing chamber, i.e., the mixing chamber diverges along its length towards the diffuser section. Having a tapered mixing chamber can facilitate the energy transfer between the higher speed primary flow through the annulus and the slower secondary flow exiting the tube 22.

The downstream end of the mixing chamber 16 is connected to the diffuser section 20. The diffuser section is in the form of a funnel having a first opening as an entrance for receiving water from the mixing chamber 16 and a wider opening as an exit at the opposite end to release water back into the free flow on the downstream side of the barrier. The diffuser section 20 diverges outwardly from the exit of the mixing chamber 16 to slow the flow down and recover static pressure before it exits the diffuser section 20 and to minimize energy loss through turbulence. The angle of diversion can be selected to optimize the performance of the diffuser.

The parameters of the diffuser section, such as the length of the section, angle of divergence, θ, and the ratio of the cross sectional area of the first and second openings are selected to suppress turbulence and to reduce energy losses caused by flow breakaway, as the flow decelerates back down to the free stream velocity. Undue turbulence, eddies and flow breakaway can impair pressure recovery as the flow approaches the exit of the diffuser section. The parameters are selected to maximize pressure recovery such that the pressure at the diffuser exit, which is set by the downstream water depth, is as high as possible above the pressure at the venturi.

Figure 7:
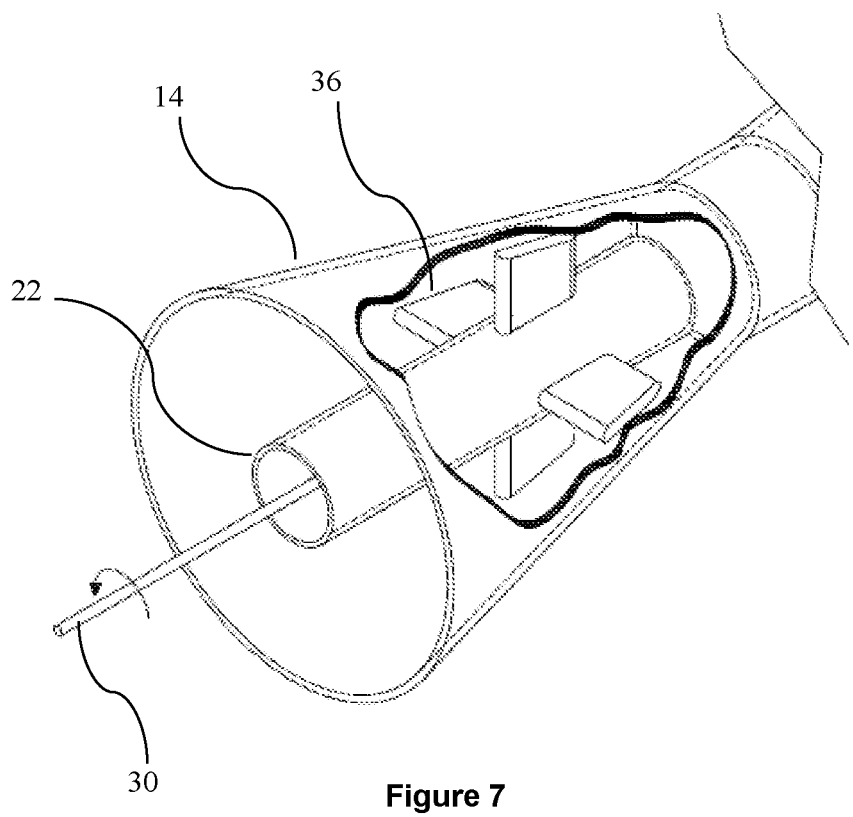
FIGS. 7 and 8 shows a cut away view of a convergent section for use in the apparatus of the invention.

The tube 22 extends along at least part of the length of the convergent section 14 and is located centrally within the convergent section 14. The tube can have a substantially uniform diameter along its length. The entrance of the tube having substantially the same diameter as the exit of the tube. With reference to FIGS. 2 and 7 the tube 22 is supported within the convergent section 14 by radial support arms 36 extending from the outside surface of the tube 22 to the inner surface of the convergent section 14. The number of support arms present can vary. Preferably 3 or 4 supports arms are used, however more or fewer support arms can be used if required. The support arms are profiled to minimize energy loss in the primary flow.

In a further embodiment the tube can comprise a convergent region at its upstream end. The convergent region of the tube facilitates a high speed of flow through the turbine. The tube can have a divergent region at the downstream end of the tube downstream of the turbine. The divergent region of the tube acts as a diffuser to help provide a preferred comparison between the speed of the secondary flow exiting the tube and the annular primary flow in the divergent section.

The tube entrance is exposed to the upstream static head and the downstream end of the tube is exposed to the reduced static head in the region of the venturi. The tube provides a flow path between the high static head upstream and the low static head in the venturi. The secondary flow 34 passes through the tube 22, induced by the amplified head drop between the upstream end of the tube and the venturi. A turbine 26 is located within the tube 22 and is connected by a drive shaft 30 to the generator 28 and extracts energy from the secondary flow. Due to the low pressure at the venturi the pressure drop between the exit of the tube 22 and the entrance of the tube is enhanced to more closely match the design pressure at which high-speed axial-flow turbines work best.

Figure 6:
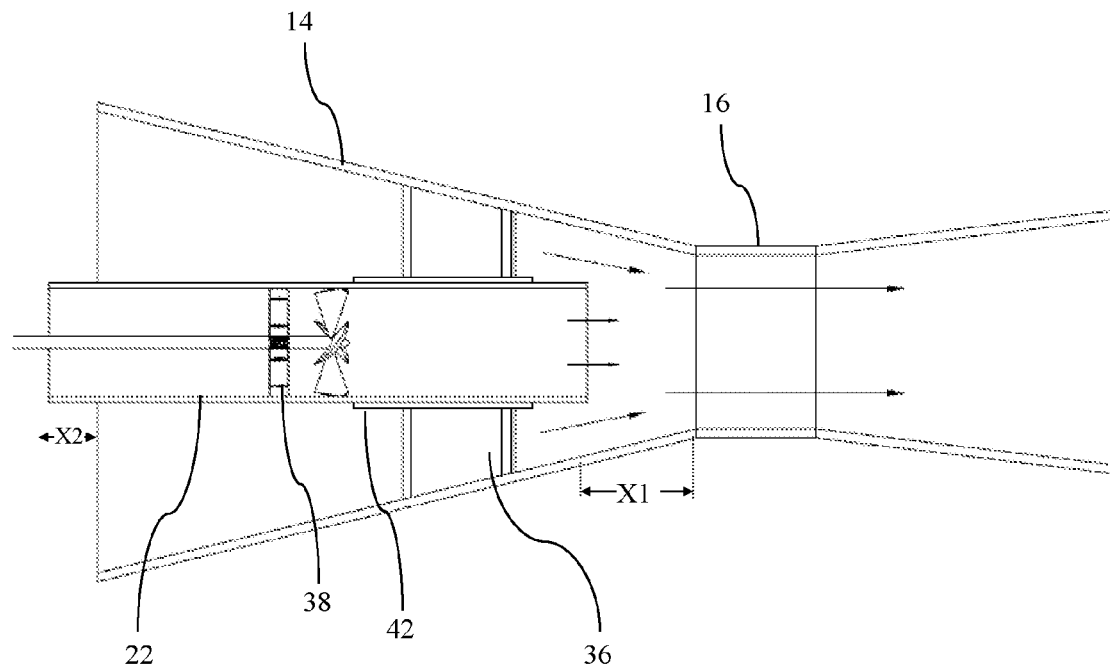
FIG. 6 shows a cross sectional side view of an embodiment of the invention.

As shown in FIGS. 2 and 6 the downstream end of the tube 22 is located within the convergent section 14 such that the downstream end of the tube is exposed to the reduced static head in the region of the venturi. The downstream end of the tube terminates a distance X1 from the mixing chamber 16. The upstream end of the tube 22 extends out from the entrance of the convergent section 14 at a distance X2. The distance X1 and X2 are selected to optimize the performance of the device and to maximize the secondary flow through the tube.

X1 and X2 can be positive or negative such that in one configuration of the apparatus, the upstream end of the tube can be positioned within the convergent section and in another configuration of the apparatus the downstream end of the tube can be positioned inside the mixing chamber.

The ability to vary distance X2 ensures that the upstream end of the tube 22 extends out from beyond the entrance of the convergent section 14 by an optimal distance that provides access for the upstream end of tube 22 to the maximum upstream pressure head without undue frictional energy losses to the secondary flow inside the tube caused by it being over-long.

The high speed primary flow 32 outside the tube at the tube's exit assists in drawing the slower secondary flow 34 through the tube and out of the end of the tube into the primary flow. The secondary flow 34 accelerates as it mixes with the primary flow 32. Varying X1, the position of the exit of the tube, from upstream of the venturi to inside the mixing chamber invokes different mixing characteristics in what is a very turbulent and complex flow regime. The flexibility to make such detail changes permits an optimal mixing regime to be selected to suit any one design and flow conditions.

Figure 5:
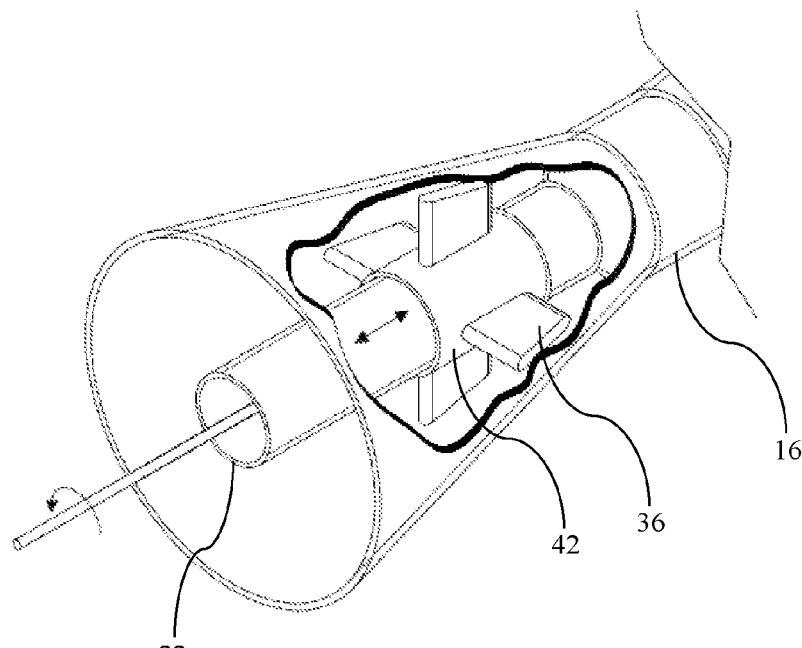
FIG. 5 shows a cut away view of an embodiment of the convergent section for use in the apparatus of the invention.

In one embodiment tube 22 is moveable forwards or backwards (downstream or upstream) relative to the mixing chamber in the axial direction. As shown in FIGS. 5 and 6 the tube 22 is supported in the convergent section 14 by a hollow supporting hub 42. Support arms 36 extend radially from the hub to the inner surface of the convergent section 14. The number of support arms can vary and are profiled to minimize energy losses in the primary flow.

The hub 42 and the tube 22 comprise a complementary screw and thread mechanism to allow movement of the tube relative to the convergent section. A screw thread inside the hub engages with a meshing thread around the local part of the tube's external surface adjacent the supporting hub. A rotating mechanism rotates the tube 22 and enables distances X1 and X2 to be varied in operation so as to suit varying operating conditions. Other indexing mechanisms that can move the position of tube relative to the convergent section and mixing section can be used. The edges of the hub can be profiled to be smooth to minimize flow interference in the primary flow, Providing the turbine before the venturi in the tube enables the upstream face of the turbine to be exposed to the ambient upstream head while the downstream face of the turbine is exposed to the low pressure zone such that there is a pressure difference across the length of the tube that creates the secondary flow. The turbine is able to take energy from the secondary flow that is pulled through the tube by the presence of the low pressure region at the tube exit.

The tube can comprise a fixed array of radial support supports blades of opposite hand to the turbine blades. For example the support blades can be right hand character and the turbine blades of left hand character or vice versa. The fixed array of radial support blades acts as flow straightening blades having an opposite hand to the turbine blades. The array of radial support blades can be positioned within the tube either upstream or downstream of the turbine and are designed to ensure that any rotary energy induced into the flow by the turbine is counteracted such that the flow emerging from the tube is as close as possible to axial.

Figure 4:
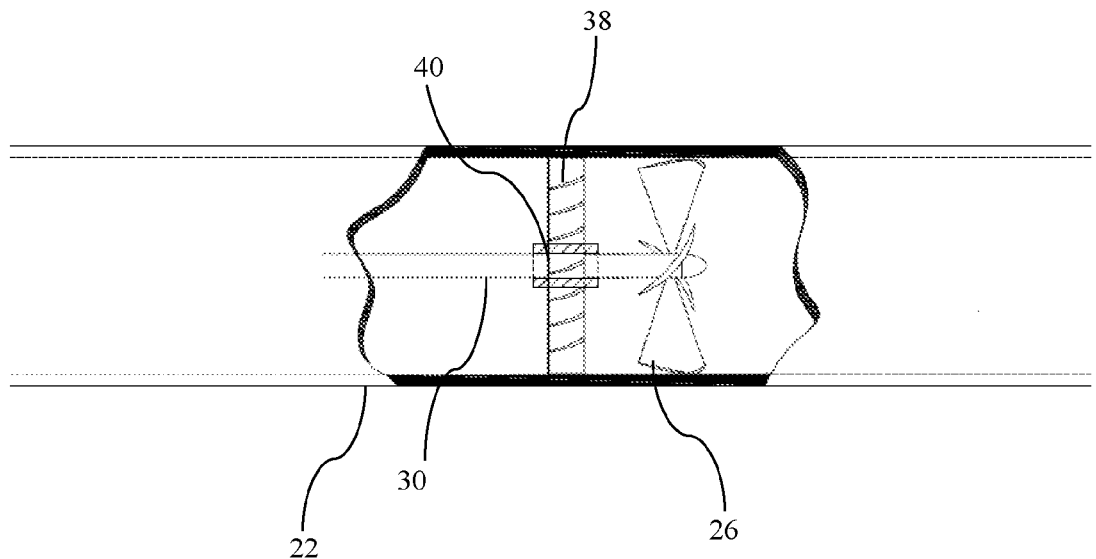
FIG. 4 shows a cut away view of the tube and turbine for use with the invention.
Figure 8:
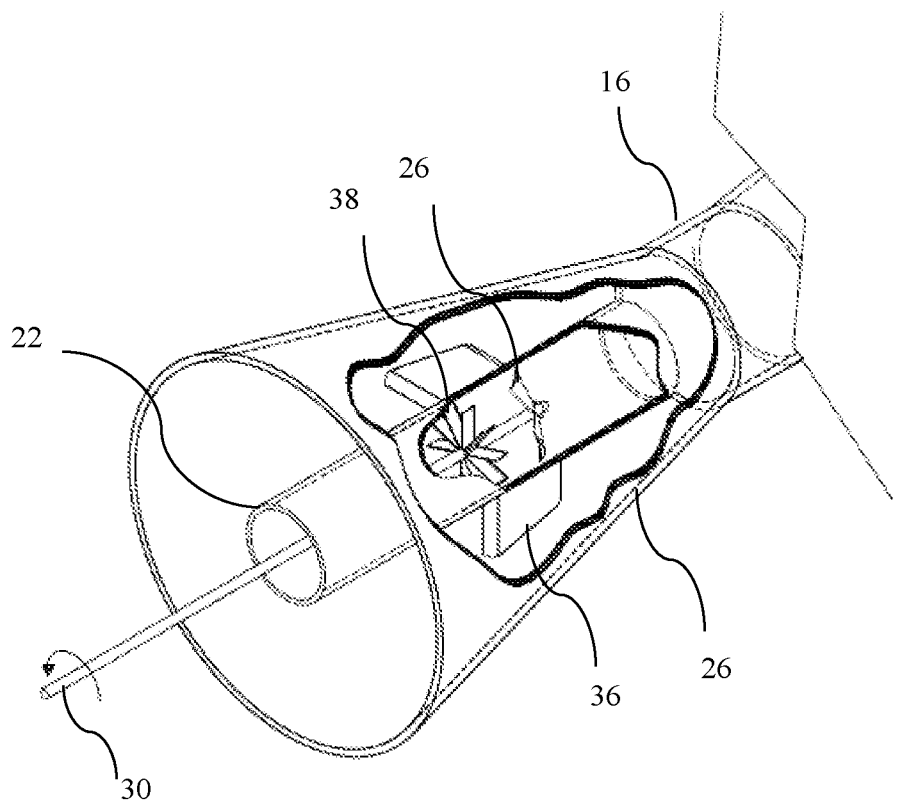

With reference to FIGS. 4, 6 and 8 the axial flow turbine is supported by a stator having a plurality of radially extending support blades 38 located upstream of the turbine. The stator may comprise two or more, preferably five or more radial support blades 38. A shaft bearing 40 is mounted on the drive shaft 30 in the center of the support blades 38. Each support blade has an attack angle to the secondary flow such that pre-swirl is introduced into the secondary flow in the opposite hand to that caused by the rotor assembly of the turbine as a result of the secondary flow through the tube. The opposite handed attack angles of the stator and rotor blades are selected to maximize the power output and create a flow that exits the downstream end of the tube 22 in an essentially axial direction with minimal swirl. The turbine 26 is connected by the drive shaft 30 to an electrical generator. The generator can be located underwater, within or in close proximity to the barrier. In other embodiments the generator can be located remote from the apparatus and/or out of the water, driven by a suitable belt or drive train connecting the turbine to the generator. Other suitable systems such as pulley wheels, drive belts, gear wheels, drive shafts, hydraulic pumps, pipe- work and hydraulic motors and mixtures of these systems can be used to connect the turbine to the generator. In further embodiments the generator can be integral with the turbine.

The ratio of the cross sectional area (A1) of the mixing chamber 16 to the cross sectional area (A2) of the downstream end of the tube 22 influences the performance of the venturi. The ratio of A1:A2 is selected to optimize the secondary flow through the tube and maximize the performance of the apparatus. The cross sectional area (A1) of the mixing chamber 16 and the cross sectional area (A3) of the entrance of the convergent section 14 also influences the performance of the venturi and is selected to optimize the secondary flow through the tube and to maximize performance of the apparatus.

Figure 9:
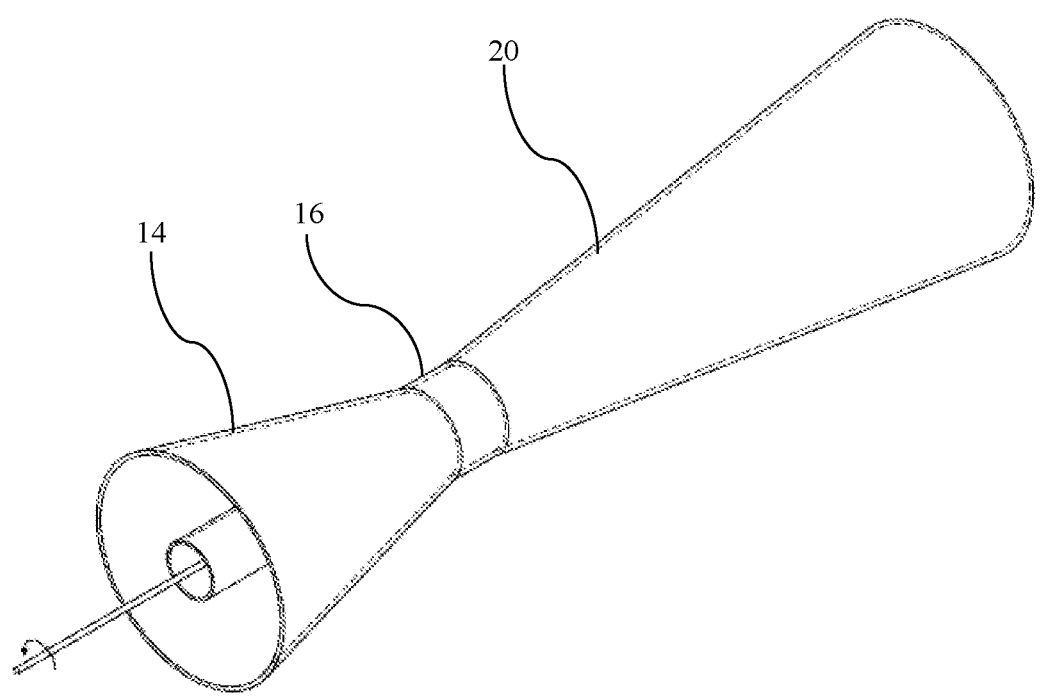
FIGS. 9 and 10 show examples of different embodiments of the invention.
Figure 10:
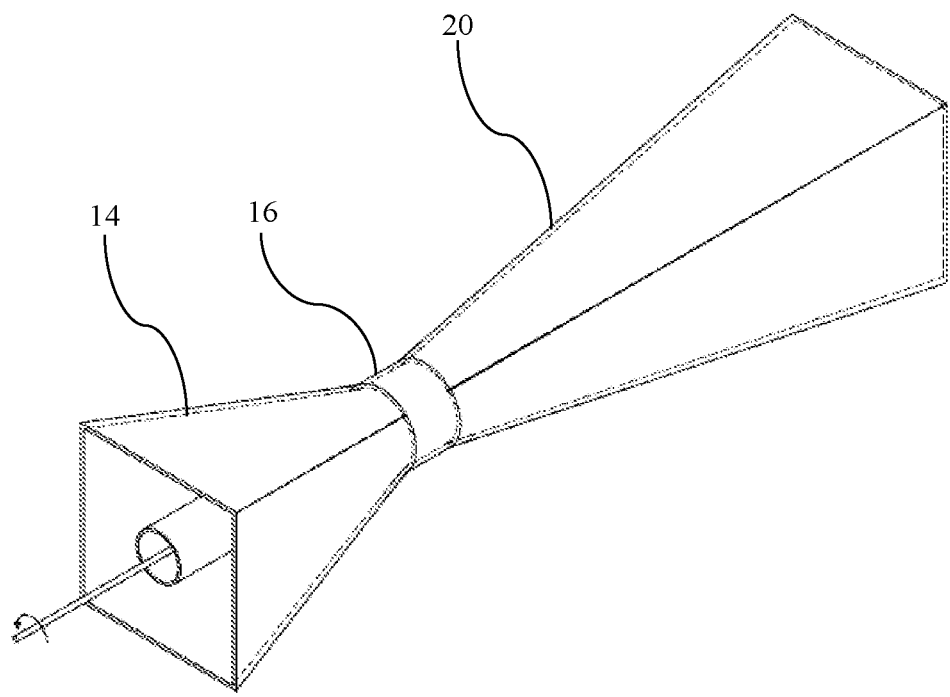

As shown in FIG. 9 in one embodiment the entrance of the convergent section 14 and the exit of the diffuser section 20 can have a substantially rectangular cross section. The convergent section 14 and the diffuser section 20 can taper down towards the mixing chamber 16 having a substantially circular cross-section. In alternative configurations the device can have a substantially circular cross section of varying diameter along its length. As shown in FIG. 10 the entrance of the convergent section 14, the exit of the diffuser section 20 and the mixing chamber 16 all have a substantially circular cross section. Other cross sectional shapes and combinations of shapes are also contemplated for the entrance of the convergent section and the exit of the diffuser sections, such as, oval and/or rectangular cross sections wherein the internal corners are rounded.

The ratio of the cross sectional area of the entrance of the convergent section to the cross sectional area of the exit of the diffuser section is selected to optimize the performance of the device. In one embodiment these two areas are substantially equal. The ratio is selected such that flow conditions downstream of the device are minimally impacted by the installation of the device and the flow conditions at the exit of the device effectively reproduce the ambient conditions prevailing in the body of water prior to the devices installation.

In one embodiment a screen (not shown) is located across the entrance of the tube. The screen has apertures to allow water to still through the tube. The screen can be any suitable screen which will still allows the secondary flow to pass through the tube. In one embodiment the screen is a fish screen.

Figure 11:
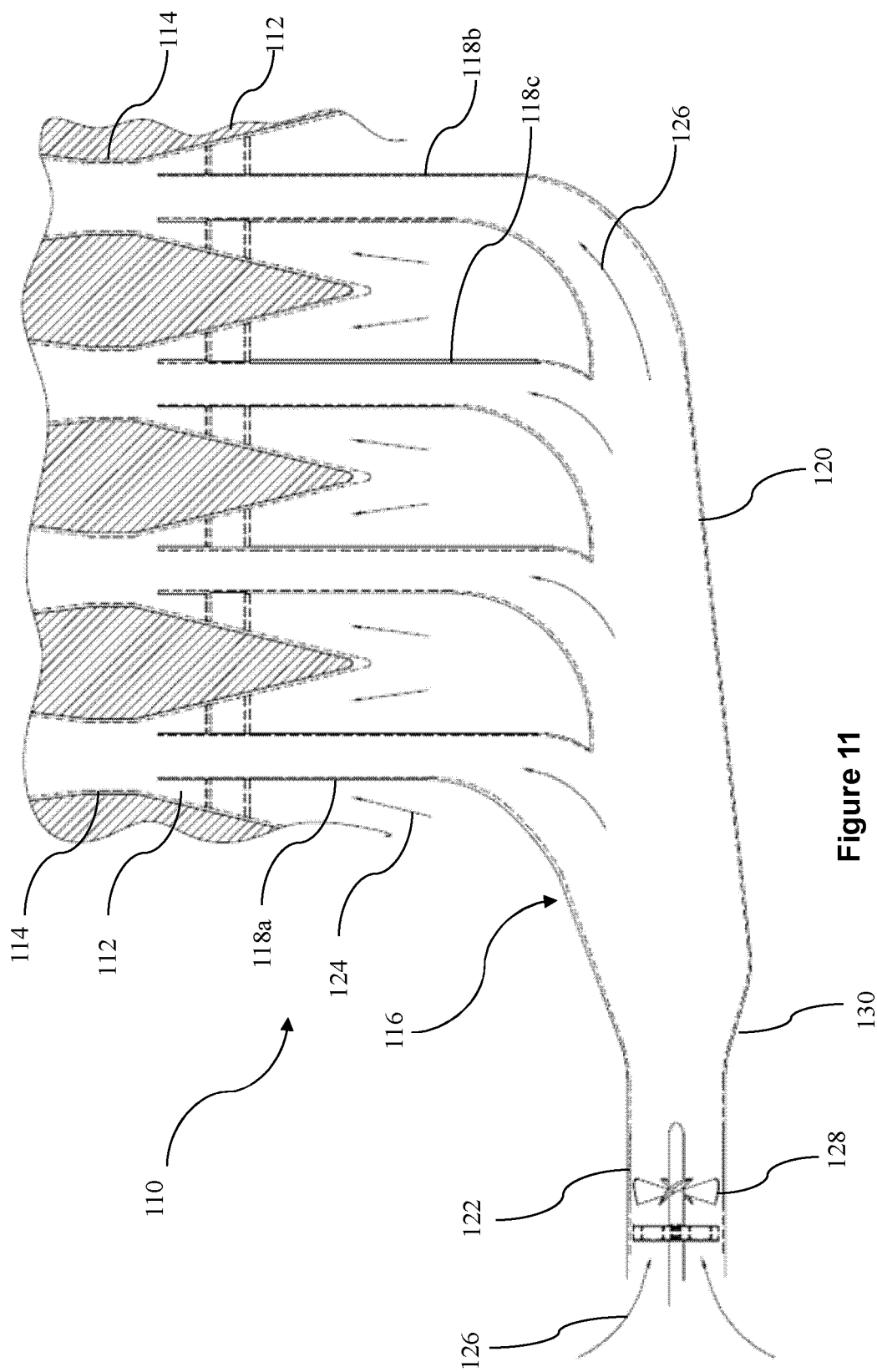
FIGS. 11 and 12 show schematic plan views of embodiments of the invention.
Figure 12:
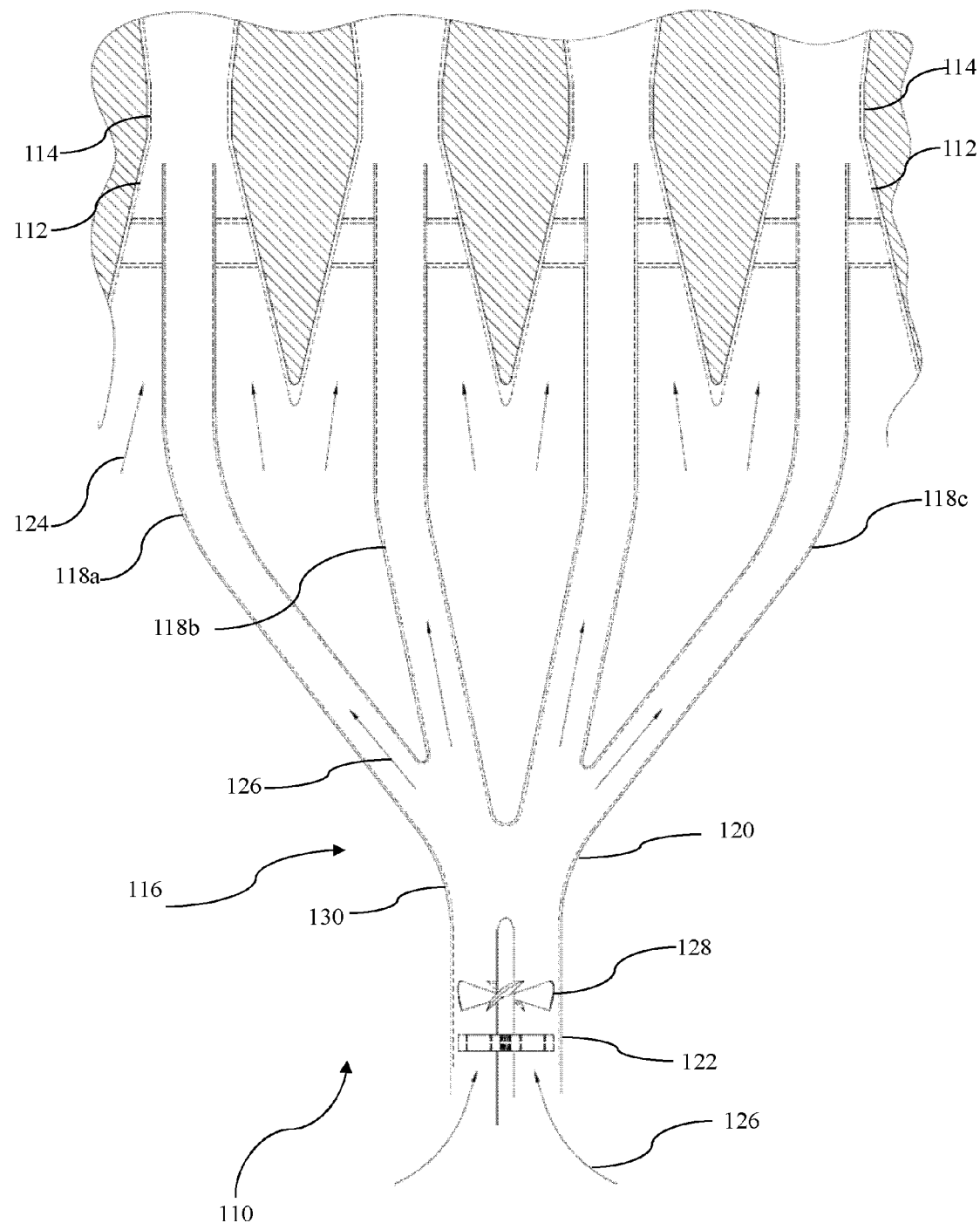

With reference to FIGS. 11 and 12 an apparatus 110 for generating electricity comprises an array of venturi modules each having a convergent section 112, a mixing chamber 114 and divergent diffuser section. In each module the convergent section narrows towards the mixing chamber such that a venturi is defined at the region of the boundary of the convergent section and mixing chamber. A diffuser section extends from the exit of the diffuser section.

A tube 116 having a single inlet is located along at least part of the length of each convergent section 112 and extends upstream in the primary flow by a suitable distance. First flow passages for the primary flow 124, are defined within the apparatus between the part of the tube 116 located within the convergent section and walls of the convergent sections 112.

The tube 116 comprises a plurality of outlet tubes 118a, 118b, 118c conjoined into a manifold 120 which connects to single inlet section 122 of the tube. The tube defines a second flow path for the secondary flow 126. The inlet of tube is located upstream of the modules such the inlet is exposed to the upstream static head and the tube provides a flow path between high static head upstream and the low static head in the venturi. A perforated screen (not shown) can be located across the entrance of inlet section 122.

The turbine 128 is located in the inlet section of the tube in the common region of the second flow path, before the tubes splits to form separate outlet tubes for directing the secondary flow 126 to each convergent section 112.

A combined secondary flow 126 is induced through the tube 116 and the single turbine 128 by the low pressure zones at the venturis. The tube can comprise a diffuser region 130 between the turbine and the manifold.

The position where the outlet tubes 118a, 188b, 188c bend and conjoin is placed sufficiently far upstream to not disturb the primary flow pattern 124 entering each convergent section 112. The junction of each tube 118a, 118b, 118c) with the combined secondary flow inside the manifolded flow is profiled to be smooth, limiting the induced turbulence at any sharp bends or internal edges.

Where a single turbine 128 serving a group of individual devices in this manner is sufficiently remote from the venturi devices, the cross-sectional area of the manifold 130 is preferably configured to be larger than that of the turbine 116 thus limiting the flow velocity in the manifold 130 and thereby limiting the corresponding kinetic energy losses that might otherwise occur.

Installing several modules together in a single water course, allows the modules to be combined together in groups with a common tubing system such that the induced secondary flow from several outlet tubes in the multiple convergent section are combined together and that combined flow is drawn through a single turbine of larger capacity than the turbine that could otherwise be installed in each separate tube, within the convergent section.

By combining the secondary flows fewer but larger turbines and generators can be employed than would otherwise be needed. This can lead to less complexity and improved cost-effectiveness.

The barrier 10 can comprises a single apparatus to generate power from the water flow. In further configurations of the system an array of apparatuses 12 can be connected to the barrier. Preferably the apparatuses are located at the base of barrier. However in other configurations the apparatus can be located at different heights of the barrier.

The apparatus is located in a body of water to generate electricity from water flow. The apparatuses 12 are connected to the barrier 10 such that at least a portion of the barrier extends substantially perpendicularly up from the apparatuses and above the water level, such that a head difference is created between the upstream and downstream sides of the barrier, when installed across a body of water. When the apparatuses are located at the base of the barrier the majority of the height of the barrier will extend above the apparatus.

The apparatus can extend transversely through the dam. Depending on the width of the barrier the apparatus may be enclosed within the barrier or extend out from the upstream and/or downstream sides of the barrier.

In one configuration at least the convergent section, divergent section and mixing chamber are located within the barrier. The entrance of the convergent section is substantially in line with the upstream side of the barrier and the exit of the divergent section is substantially in line with the downstream side of the barrier.

In another configuration the apparatuses can extend downstream of the barrier, such that the entrance of the convergent section is substantially in line with the upstream side of the barrier, whilst the exit of the divergent extends beyond the width of the barrier.

The barrier can be installed to minimize by-pass flow around the structure. In one embodiment the barrier is installed on the bed of the stream, river or tidal flow and across the entire width of the stream, river or tidal flow to minimize by-pass flow.

Whilst the device is described with reference to being part of barrier system in a body of water to generate power from fluid flow. The device can also be used in other applications for generating electricity where there is a high volume low head flow.

In view of these and other variants within the inventive concept, reference should be made to the appended claims. Other changes can be made within the scope of the invention. For example the features further described for the apparatus comprising the single convergent section can also be incorporate into the apparatus comprising multiple venturi modules. While the apparatus with multiple venturi modules is exemplified with four venturi tubes, more or less modules can be included in the apparatus, for example two or more venturi modules can be present.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for generating electricity from water flow comprising:
   a convergent section connected to a first end of a mixing chamber such that a venturi is defined between the end of the convergent section and the mixing chamber;
   a diffuser section connected to a second end of the mixing chamber, the diffuser configured such that in use the pressure at the exit of the diffuser is greater than the pressure at the venturi;
   at least part of a tube located in the convergent section, such that an annulus is defined between the tube and the convergent section, to form a first flow passage, and the tube defining a second flow passage within the tube; and
   a turbine connectable to a generator; wherein the turbine is located within the tube.

2. The apparatus according to claim 1 further comprising a screen located across the opening of the tube.

3. The apparatus according to claim 1 wherein the tube is moveable relative to the convergent section and the mixing chamber.

4. The apparatus according to claim 1 wherein the downstream end of the tube is positioned upstream of the venturi, downstream of the venturi or substantially level with the venturi.

5. The apparatus according to claim 1 wherein the tube is connected to the inner surface of the convergent section by support arms.

6. The apparatus according to claim 1 wherein the tube is supported within a hub.

7. The apparatus according to claim 6 wherein the hub comprises a movement mechanism to axially move the tube.

8. The apparatus according to claim 6 wherein the hub and tube comprises a screw and thread mechanism to allow movement of the tube relative to the convergent section.

9. The apparatus according to claim 1 wherein the upstream end of the tube is located within the convergent section.

10. The apparatus according to claim 1 wherein the upstream end of the tube is located upstream from the entrance of the convergent section.

11. The apparatus according to claim 1 further comprising an array of radial support blades within the tube.

12. The apparatus according to claim 11 wherein the array of radial support blades are located downstream of the turbine and/or upstream of the turbine.

13. The apparatus according to claim 1 wherein the tube has a convergent region at its upstream end.

14. The apparatus according to claim 1 wherein the tube has a divergent region at its downstream end.

15. The apparatus according to claim 1 wherein the tube has a substantially uniform diameter along its length.

16. The apparatus according to claim 1 wherein the ratio of the cross sectional area of the entrance of the convergent section to the cross sectional area of the entrance of the mixing chamber is selected to optimize the secondary flow rate through the tube and the pressure difference between the upstream end and downstream end of the tube.

17. The apparatus according to claim 1 wherein the ratio of the cross sectional area of the entrance of the mixing chamber and the cross sectional area of the tube is selected to optimize the secondary flow rate through the tube and the pressure difference between the upstream end and downstream end of the tube.

18. The apparatus according to claim 1 wherein the ratio of the cross sectional area of the entrance of the convergent section to the cross sectional area of the exit of the diffuser section is selected to optimize the performance of the apparatus.

19. The apparatus according to claim 1 wherein the ratio of the cross sectional area of the entrance of the convergent section to the cross sectional area of the exit of the diffuser section is approximately 1:1.

20. The apparatus according to claim 1 wherein the turbine is connected to a generator by a drive shaft.

21. The apparatus according to claim 1 wherein the exit of the diffuser section comprises a substantially rectangular, oval or circular cross section.

22. The apparatus according to claim 1 wherein the entrance of the convergent section comprises a substantially rectangular, oval or circular cross section.

23. The apparatus according to claim 1 wherein the diffuser section and the convergent section have a substantially circular cross section.

24. The apparatus according to claim 1 wherein the mixing chamber has a substantially circular cross section.

25. The apparatus according to claim 1 wherein the mixing chamber converges in the downstream direction.

26. The apparatus according to claim 1 wherein the mixing chamber is diverged in the downstream direction.

27. An apparatus for generating electricity from water flow comprising:
   a plurality of convergent sections, each convergent section connected to a first end of a mixing chamber such that a venturi is defined between the end of the convergent section and the mixing chamber;
   a plurality of diffuser sections each diffuser section connected to a second end of one of the mixing chambers, the diffuser configured such that in use the pressure at the exit of the diffuser is greater than the pressure at the venturi;
   a tube comprising a inlet tube, a manifold and a plurality of outlets tubes extending from the manifold, wherein at least part of one of the outlet tubes is located in one of the convergent sections, such that an annulus is defined between the outlet tube and the convergent section, to form a first flow passage, and the tube defining a second flow passage within the tube; and
   a turbine connectable to a generator; wherein the turbine is located within the tube.

28. The apparatus according to claim 27 further comprising a screen having apertures located across the opening of the inlet tube.

29. The apparatus according to claim 27 wherein the turbine is located in the inlet tube.

30. The apparatus according to claim 27 wherein the tube comprises a diffuser region located between the manifold and inlet tube.

31. The apparatus according to claim 27 wherein the cross sectional area of the manifold region of the tube is larger than the cross sectional region of the tube where the turbine is located.

32. An apparatus according to claim 1 attached to a dam to provide a flow passage through the dam.

33. A system for generating electricity from water flow comprising;
   a barrier for locating across a flowing body of water; and provided with
   at least one apparatus according to claim 1, wherein the apparatus is positioned such that in use provides a flow path from the upstream side of the barrier to the downstream side of the barrier.

34. A system according to claim 33 wherein the barrier comprises at least two apparatuses according to claim 1.

35. A method for providing a flow passage through a barrier across a body of water comprising:
   installing at least one apparatus as claimed in claim 1 in the barrier.

36. A method of generating electricity from water flow comprises:
   installing a system as claimed in claim 33 or an apparatus as claimed claim 1 across a body of water to provide a reservoir of water, such that a head difference is created between the upstream and downstream sides of the barrier; and
   using the flow of water through the apparatus to rotate the turbine.

* * * * *